United States Patent [19]

Hasegawa

[11] Patent Number: 4,492,129
[45] Date of Patent: Jan. 8, 1985

[54] SHIFT LEVER FOR AN AUTOMOTIVE TRANSMISSION

[75] Inventor: Hideo Hasegawa, Yokohama, Japan

[73] Assignee: Nissan Motor Company, Limited, Japan

[21] Appl. No.: 372,390

[22] Filed: Apr. 27, 1982

[30] Foreign Application Priority Data

Apr. 28, 1981 [JP] Japan .................................. 56-64688

[51] Int. Cl.³ ........................ B60K 20/60; G05G 1/10
[52] U.S. Cl. .................................... 74/473 R; 74/523; 403/224; 403/372
[58] Field of Search ............. 74/543, 548, 523, 473 R, 74/473 P, 470; 403/268, 267, 226, 224, 225, 269, 273, 372

[56] References Cited

U.S. PATENT DOCUMENTS

| 1,927,646 | 9/1933 | Miller | 74/473 P |
|---|---|---|---|
| 1,964,432 | 6/1934 | Geyer | 403/226 |
| 2,041,704 | 5/1936 | Gordon et al. | 74/551.3 X |
| 2,290,249 | 7/1942 | Piperoux | 403/269 |
| 3,315,537 | 4/1967 | Keller | 74/473 P |
| 3,342,041 | 9/1967 | Nebiker, Jr. | 403/372 |
| 3,406,586 | 10/1968 | Hobbins | 74/473 P |
| 3,601,431 | 10/1971 | Henley | 403/372 |
| 3,693,497 | 9/1972 | Oehl | 74/473 R |
| 3,769,853 | 11/1973 | Schluckebier | 74/543 |
| 4,147,443 | 4/1979 | Skobel | 403/267 |
| 4,282,768 | 8/1981 | Osborn | 74/473 R |
| 4,333,360 | 6/1982 | Simmons | 74/473 P |

Primary Examiner—Kenneth Dorner
Attorney, Agent, or Firm—Lowe, King, Price & Becker

[57] ABSTRACT

A shift lever for an automotive transmission includes first and second shafts. The first shaft has a hole and the second shaft partially extends into the hole so as to be spaced from the first shaft by a resilient member preventing transmission of vibrations between the shafts. In a method of manufacturing the shift lever, plastic rubber is provided in the spacing between the first and second shafts. The rubber is vulcanized so as to have a predetermined resiliency and adhere to both of the first and second shafts.

4 Claims, 7 Drawing Figures 4,492,129

SHIFT LEVER FOR AN AUTOMOTIVE TRANSMISSION

BACKGROUND OF THE INVENTION

1. Field of the Invention

The present invention relates to a shift lever for an automotive transmission which prevents transmission of vibration, and also relates to a method of manufacturing the shift lever.

2. Description of the Prior Art

It is known to provide rubber in the shift lever of an automotive transmission to prevent transmission of vibration along the shift lever. However, such conventional levers have been unsatisfactory from the standpoint of structural simplicity.

SUMMARY OF THE INVENTION

It is an object of the present invention to provide a shift lever for an automotive transmission which prevents transmission of vibration therealong with a simple structure.

Another object of the present invention is to provide a method of manufacture for a shift lever designed to prevent transmission of vibrations.

In accordance with the present invention, a shift lever for an automotive transmission includes first and second shafts. The first shaft has a hole. The second shaft partially extends into the hole in the first shaft in such a manner as to be spaced from the first shaft. In a method of manufacturing the shift lever, plastic rubber is provided in the spacing between first and second shafts. The rubber is vulcanized so as to have a predetermined resiliency and adhere to both of the first and second shafts.

The above and other objects, features and advantages of the present invention will be apparent from the following description of preferred embodiments thereof, taken in conjunction with the drawings.

DETAILED DESCRIPTION OF THE PREFERRED EMBODIMENTS

Figure 1:
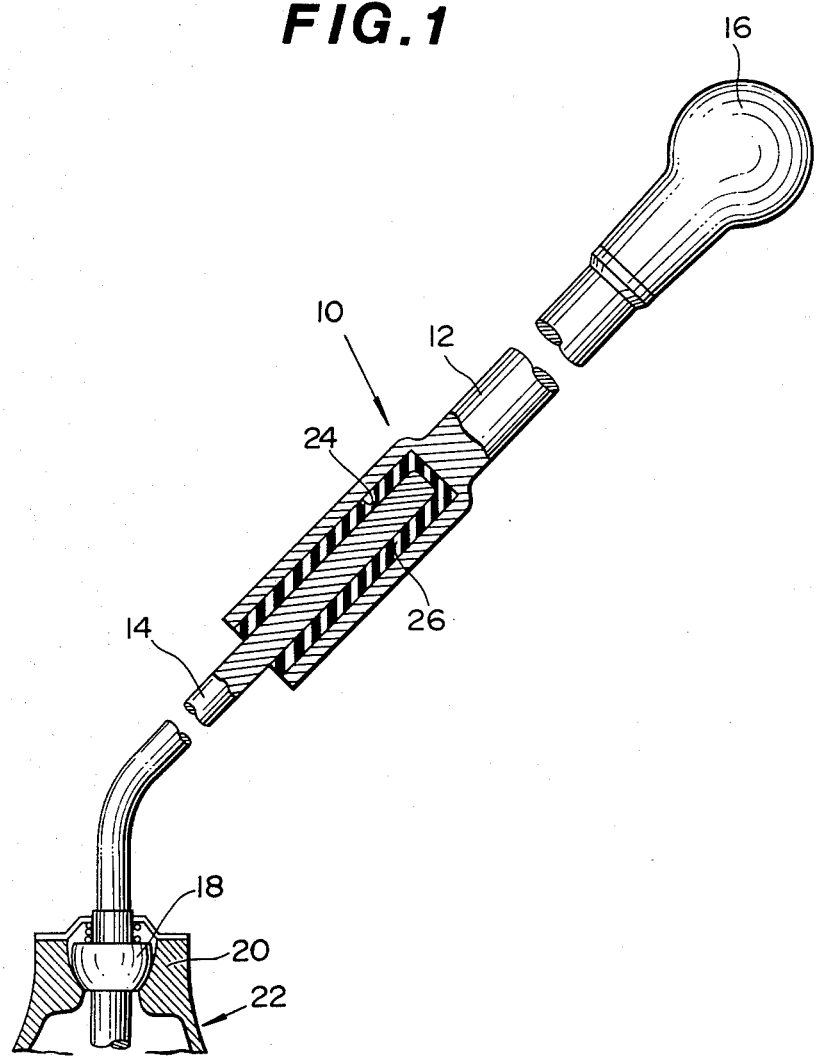
FIG. 1 is a side elevational view, partly in logitudinal section, of a shift lever according to a first embodiment of the present invention.

With reference to FIG. 1, a shift lever 10 for an automotive transmission according to a first embodiment of the present invention lever includes first and second shafts 12 and 14 connected in tandem to each other. The first shaft 12 extends obliquely with respect to the vertical and horizontal. The second shaft 14 has a curved portion below which it extends vertically and above which it extends obliquely. The upper end of the second shaft 14 is indirectly connected to the lower end of the first shaft 12 as will be described hereinafter. The upper end of the shaft 12 is provided with a knob 16. An essentially-hemispherical ball 18 is concentrically mounted on shaft 14 below the curved portion. Ball 18 is rotatably received in a socket 20 formed in a transmission casing 22 so that the ball and thus the shaft 14 can rotate substantially about the socket 20. The lower end of the shaft 14 is in turn connected to an automotive transmission (not shown) to enable the latter to be controlled. The user can usually move the shift lever 10 by means of knob 16.

The lower end of the shaft 12 is larger in outside diameter than the intermediate portion of the shaft, and is provided with a central hole or bore 24 of circular cross-section running coaxially with an opening at the lower end of the shaft. The upper end of shaft 14 is of circular cross-section smaller than that of the bore 24 in shaft 12 so as to be permitted to extend into the bore with spacing provided between the periphery of the shaft 14 and the circumferential inner-surface of the shaft 12. The upper end of the shaft 14 is coaxial with the shaft 12 and terminates in the bore 24 in such a manner that spacing will remain between the end surface of the shaft 14 and the top inner-surface of the shaft 12 or ceiling of the bore 24. A resilient member or rubber 26 is provided in the spacings between the shafts 12 and 14, and adheres or bonds to both of shafts 12 and 14.

The rubber 26 prevents the transmission of vibration between shafts 12 and 14. The lower shaft 14 is usually subjected to vibrations from the transmission, automotive engine, etc. The rubber 26, therefore, prevents such vibration from travelling to the shaft 12, the knob 16, and thus the user. Since rubber 26 adheres to both of the shafts 12 and 14, the rubber essentially prevents relative rotation between or separation of the shaft.

During manufacture of the shift lever 10, the end of the second shaft 14 is inserted into the bore 24 in the first shaft 12 in such a manner as to be spaced from the shaft 12. The first shaft 12 is preferably aligned below the second shaft 14. After the alignment of the shafts 12 and 14, non-vulcanized or plastic rubber made from crude rubber is packed into the bore 24 to fill the spacing between the shafts 12 and 14. Thus, the shafts 12 and 14 constitute a mold for the plastic rubber. The packed rubber is then vulcanized so as to have a predetermined resiliency and adhere or bond to both of the shafts. Thus, the packed rubber constitutes resilient member 26. In the case where the shafts 12 and 14 are made of metal, such as iron, iron alloy, or copper alloy, the surfaces of the shafts 12 and 14 to be attached to the rubber are, preferably, preliminarily brass-plated to achieve reliable bonding of the rubber to the shafts 12 and 14.

The insertion of the end of second shaft 14 into bore 24 of the first shaft 12 may follow packing of the plastic rubber into the bore. In this case, the insertion of the end of the second shaft 14 into the bore 24 is previous to the vulcanization of the packed rubber.

A sheet of non-vulcanized or plastic rubber may be wrapped around the end of the second shaft 14 to form the resilient member 26. In this case, after the wrapping of the rubber sheet around the end of the shaft 14, end of the shaft 14 with the rubber sheet is inserted into the bore 24 in the shaft 12 and then the rubber sheet is vulcanized so as to adhere or bond to both of the shafts.

Bore 24 may be provided in the second shaft 14 instead of first shaft 12. In this case, the end of the shaft 12 is so arranged as to be insertable into a bore formed in shaft 14. After said insertion of the non-vulcanized or plastic rubber is packed into the bore and then vulcanized to adhere or bond to both shafts.

Figure 2:
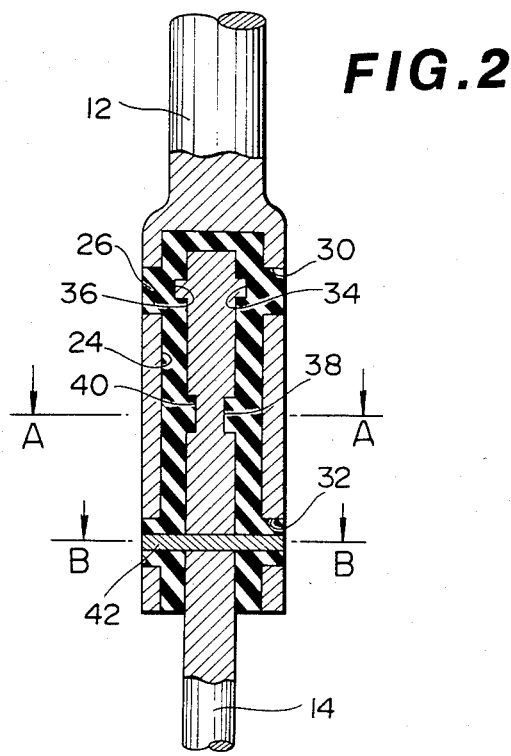
FIG. 2 is a longitudinal section of an essential portion of a shift lever according to a second embodiment of the present invention.
Figure 3:
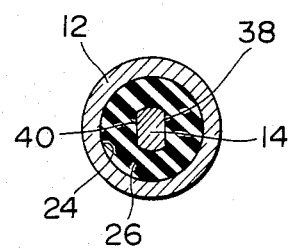
FIG. 3 is a cross-section of the shift lever taken along line A—A of FIG. 2.
Figure 4:
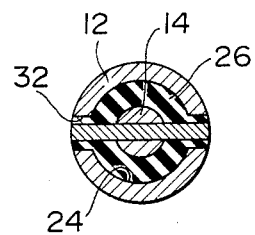
FIG. 4 is a cross-section of the shift lever taken along line B—B of FIG. 2.

An essential portion of a second embodiment of the present invention is shown in FIGS. 2, 3, and 4 wherein similar or corresponding elements are designated by the same numerals as those used in FIG. 1. This embodiment is designed similar to that of the first embodiment except for the following.

A first shaft 12 has diametrically-extending upper and lower holes 30 and 32, which perpendicularly pass through a bore 24 in the first shaft. These holes 30 and 32 accommodate part of a rubber 26 to increase an effective area of the rubber 26 in adherence to the shaft 12 and achieve a more reliable bonding of the rubber 26 to the shaft 12 with regard to circumferential and/or axial forces.

A second shaft 14 has a pair of radially-extending projections 34 and 36, which are diamterically-opposed and aligned with the upper hole 30. Projections 34 and 36 extend into the rubber 26. The second shaft 14 also has a pair of diametrically-opposed recesses 38 and 40, which accommodate part of the rubber 26. A diametrically-extending rod 42 is mounted on the second shaft 14 in such a manner as to run in the lower hole 32 and the bore 24. Thus, the rod 42 extends in the rubber 26. The rod 42 is coaxial with the lower hole 32 and is of such diameter as to be spaced from the first shaft 12. The spacing between the rod 42 and the shaft 12 accommodates part of the rubber 26. The projections 34 and 36, the recesses 38 and 40, and the rod 42 increase an effective area of the rubber 26 in adherence to the shaft 14, and provide a more reliable bonding of the rubber 26 to the shaft 14 with regard to circumferential and/or axial forces. Rod 42 particularly ensures axial and radial coupling of shaft 14 to the shaft 12.

In this embodiment, the inner surface of the first shaft 12 facing the bore 24 may be provided with a recess accommodating part of the rubber 26 to achieve a more reliable bonding of the rubber 26 to the shaft 12.

Figure 5:
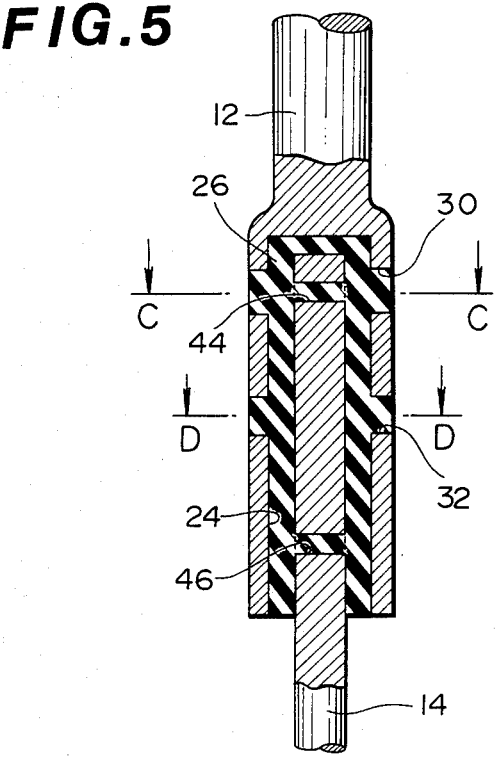
FIG. 5 is a longitudinal section of an essential portion of a shift lever according to a third embodiment of the present invention.
Figure 6:
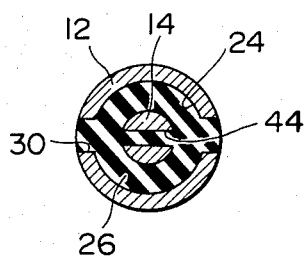
FIG. 6 is a cross-section of the shift lever taken along line C—C of FIG. 5.
Figure 7:
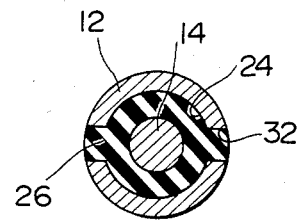
FIG. 7 is a cross-section of the shift lever taken along line D—D of FIG. 5

An essential portion of a third embodiment of the present invention is shown in FIGS. 5, 6, and 7 wherein similar or corresponding elements are designated by the same numerals as those used in FIGS. 1, 2, 3, and 4. This embodiment is designed in a manner similar to that of the previous first embodiment except for the following points.

A first shaft 12 has diametrically-extending upper and lower holes 30 and 32, which perpendicularly pass through a bore 24 in the shaft. These holes 30 and 32 accommodate part of a rubber 26 to achieve a more reliable bonding of the rubber 26 to the shaft 12 with regard to radial and/or axial forces.

A second shaft 14 has diametrically-extending holes 44 and 46 at positions facing the first shaft 12. The opposite ends of each hole 44 or 46 are thus open to a bore 24 in the first shaft 12. These holes 44 and 46 accommodate part of the rubber 26 to achieve a more reliable bonding of the rubber 26 to the second shaft 14 with regard to radial and/or axial forces.

It should be understood that further modifications and variations may be made in the present invention without departing from the spirit and scope of the present invention as set forth in the appended claims.

What is claimed is:

1. A shift lever for an automotive transmission, comprising:
    (a) a first shaft having a first hole and a second hole opening to the first hole;
    (b) a second shaft extending partially into the first hole;
    (c) a resilient member located in the second hole and in a section of the first hole forming a space between the first and second shafts, the resilient member completely surrounding the second shaft within the first hole and adhering to both of the first and second shafts; and
    (d) a rod mounted on the second shaft and extending into the first and second holes, the rod extending in the resilient member located in the first and second holes and being spaced from the first shaft by the resilient member, said resilient member extending continuously into the second hole from a portion thereof in the first hole.

2. A shift lever as recited in claim 1, wherein the second shaft has a projection extending into the resilient member.

3. A shift lever as recited in claim 1, wherein the second hole extends generally perpendicular to the first hole.

4. A shift lever as recited in claim 1, wherein the second shaft has a recess accommodating part of the resilient member.

* * * * *